United States Patent
Lang et al.

(10) Patent No.: US 9,477,761 B2
(45) Date of Patent: *Oct. 25, 2016

(54) SEARCH METHOD, SEARCH APPARATUS AND SEARCH ENGINE SYSTEM

(71) Applicant: Alibaba Group Holding Limited, Grand Cayman (KY)

(72) Inventors: Hao Lang, Beijing (CN); Chao Tang, Beijing (CN); Xiaoxun Zhang, Beijing (CN); GuiRong Xue, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,883

(22) Filed: Jan. 5, 2015

(65) Prior Publication Data

US 2015/0161263 A1    Jun. 11, 2015

Related U.S. Application Data

(63) Continuation of application No. 13/677,147, filed on Nov. 14, 2012, now Pat. No. 8,959,080.

(30) Foreign Application Priority Data

Nov. 15, 2011    (CN) .......................... 2011 1 0361975

(51) Int. Cl.
*G06F 17/30* (2006.01)
(52) U.S. Cl.
CPC ... *G06F 17/30864* (2013.01); *G06F 17/30861* (2013.01); *G06F 17/30967* (2013.01)
(58) Field of Classification Search
None
See application file for complete search history.

(56) References Cited

U.S. PATENT DOCUMENTS

| | | | |
|---|---|---|---|
| 7,620,628 B2 | 11/2009 | Kapur et al. | |
| 7,840,547 B1* | 11/2010 | Tucker | G06F 17/30457 |
| | | | 707/706 |
| 8,041,733 B2 | 10/2011 | Rouhani-Kalleh | |
| 8,219,575 B2 | 7/2012 | Wong | |
| 8,533,181 B2* | 9/2013 | Hu | G06F 17/30442 |
| | | | 707/718 |
| 8,667,007 B2 | 3/2014 | Tao | |
| 8,745,076 B2* | 6/2014 | Pazdziora | G06F 17/30389 |
| | | | 707/759 |
| 8,799,312 B2* | 8/2014 | Ahmadi | G06F 17/3064 |
| | | | 707/769 |
| 2005/0246332 A1 | 11/2005 | Wang et al. | |
| 2006/0106769 A1* | 5/2006 | Gibbs | G06F 17/276 |
| 2006/0122979 A1 | 6/2006 | Kapur et al. | |
| 2006/0248074 A1 | 11/2006 | Carmel et al. | |

(Continued)

OTHER PUBLICATIONS

Alemzadeh et al., "An Efficient Method for Tagging a Query with Category Labels Using Wikipedia towards Enhancing Search Engine Results," International Conference on Web Intelligence and Intelligent Agent Technology (WI-IAT), 2010 IEEE/WICC/ACM, Aug. 31, 2010, pp. 192-195.

(Continued)

*Primary Examiner* — Hung Le
(74) *Attorney, Agent, or Firm* — Lee & Hayes, PLLC

(57) ABSTRACT

Techniques for performing searches using models generated from data mining. These techniques may include receiving a query including a search string. If a portion of the search string matches with a category of relationship data, the portion of the search string may be replaced with a label of the category to generate a modified query. Based on the modified query and models generated from mining historical search data, intent of the query may be determined, and searches may be then performed.

20 Claims, 6 Drawing Sheets

(56) References Cited

U.S. PATENT DOCUMENTS

| | | | |
|---|---|---|---|
| 2007/0050339 A1 | 3/2007 | Kasperski et al. | |
| 2008/0033917 A1* | 2/2008 | Jones | G06F 17/30899 |
| 2008/0097955 A1 | 4/2008 | Kapur | |
| 2008/0313142 A1 | 12/2008 | Wang et al. | |
| 2009/0094224 A1* | 4/2009 | Ricket | G06F 17/30864 |
| 2009/0119095 A1* | 5/2009 | Beggelman | G06F 17/2785 704/9 |
| 2010/0094826 A1* | 4/2010 | Rouhani-Kalleh | G06F 17/30707 707/705 |
| 2010/0094835 A1* | 4/2010 | Lu | G06F 17/30672 707/705 |
| 2010/0094854 A1* | 4/2010 | Rouhani-Kalleh | G06F 17/30646 707/706 |
| 2010/0185645 A1* | 7/2010 | Pazdziora | G06F 17/30389 707/760 |
| 2010/0281017 A1* | 11/2010 | Hu | G06F 17/30477 707/718 |
| 2010/0299342 A1 | 11/2010 | Gustafson et al. | |
| 2010/0312756 A1 | 12/2010 | Zhang et al. | |
| 2011/0072031 A1 | 3/2011 | Bird et al. | |
| 2011/0093488 A1 | 4/2011 | Amacker et al. | |
| 2011/0320470 A1 | 12/2011 | Williams et al. | |
| 2012/0117102 A1 | 5/2012 | Meyerzon et al. | |
| 2012/0124063 A1 | 5/2012 | Wong | |
| 2012/0143895 A1 | 6/2012 | Salvetti et al. | |
| 2012/0179705 A1 | 7/2012 | Kumaran et al. | |
| 2012/0259829 A1 | 10/2012 | Zhou | |
| 2013/0086509 A1 | 4/2013 | Satyanarayana et al. | |

OTHER PUBLICATIONS

Glover et al., "Improving Category Specific Web Search by Learning Query Modifications," Proceedings of Saint 2001 Symposium on Applications and the Internet, Jan. 8-12, 2001, San Diego, CA, USA, IEEE Computer Society, Los Alamitos, CA, USA, pp. 23-32.

Office Action for U.S. Appl. No. 13/677,147, mailed on Apr. 23, 2014, Hao Lang, "Search Method, Search Apparatus and Search Engine System," 8 pages.

Office action for U.S. Appl. No. 13/677,147, mailed on Aug. 5, 2014, Lang et al., "Search Method, Search Apparatus and Search Engine System," 9 pages.

PCT Search Report mailed Apr. 4, 2013 for PCT application No. PCT/US12/65096, 10 pages.

Translated Chinese Office Action matiled Jul. 21, 2015 for Chinese patent application No. 201110361975.3, a counerpart foreign application of U.S. Appl. No. 14/589,883.

* cited by examiner

SEARCH METHOD, SEARCH APPARATUS AND SEARCH ENGINE SYSTEM

CROSS REFERENCE TO RELATED PATENT APPLICATIONS

This application is a continuation of and claims priority to U.S. patent application Ser. No. 13/677,147 filed on Nov. 14, 2012, which claims priority to Chinese Patent Application No. 201110361975.3, filed on Nov. 15, 2011, entitled "Search Method, Search Apparatus and Search Engine System, both of which are incorporated herein by reference.

TECHNICAL FIELD

This disclosure relates to the field of network technologies. More specifically, the disclosure relates to a search method, a search device and a search engine system.

BACKGROUND

Search engine systems gather information from the Internet and present users with search results in response to queries. Conventional search engine systems perform searches based on the results' popularity and relevancy. However, sometime the results do not match the user intent of searches. For example, a user may intend to download a song "Firefly" sung by a singer "Wang Fei." But conventional search engine systems may return links associated with insects as top ranks. To avoid this situation, many different approaches have been proposed (e.g., category searches). While important progress has been made, the existing approaches present problems, e.g., low accuracy and efficiency for Internet searching.

SUMMARY

Described herein are techniques for performing searches using models generated from data mining. The techniques may analyze historical search data to generate models including intended words and labels of categories of relationship data. These models may be used to analyze queries to determine intent associated with the queries. Based on the queries and intent, the techniques may then perform searches.

This Summary is not intended to identify all key features or essential features of the claimed subject matter, nor is it intended to be used alone as an aid in determining the scope of the claimed subject matter.

BRIEF DESCRIPTION OF THE DRAWINGS

The Detailed Description is described with reference to the accompanying figures. The use of the same reference numbers in different figures indicates similar or identical items.

DETAILED DESCRIPTION

The discussion below describes specific exemplary embodiments of the present disclosure. The exemplary embodiments described here are for exemplary purposes only, and are not intended to limit the present disclosure.

Figure 1:
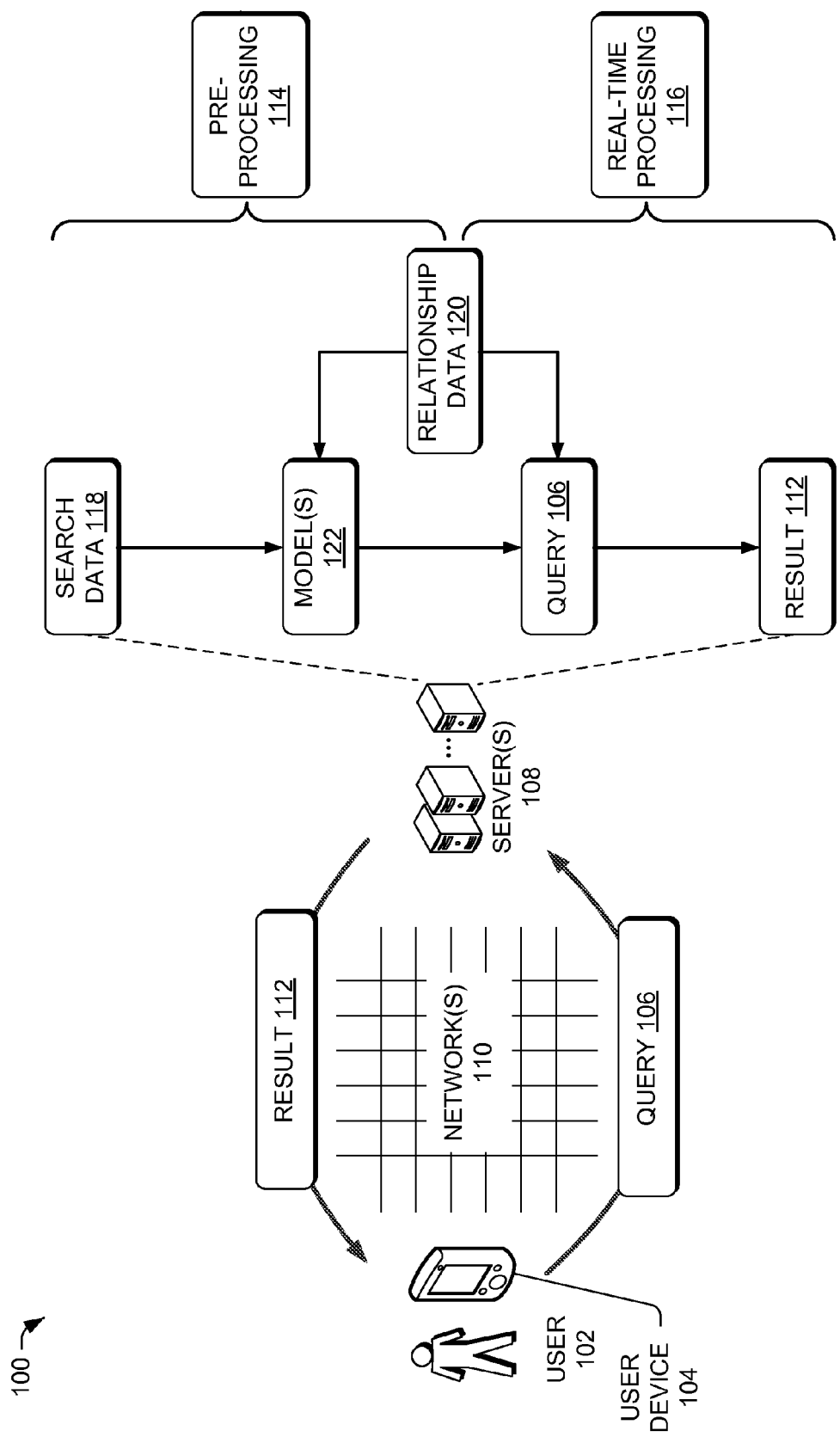
FIG. 1 illustrates an example architecture that includes server(s) for performing data mining and searches.

FIG. 1 illustrates an example architecture 100 that includes server(s) for perform data mining and searches. A user may submit a query to a server, and the server may perform searches and return results. In some embodiments, the server may conduct data pre-processing (e.g., offline data processing) before performing searches. The data pre-processing may be conducted on historical search data including a large scale of queries received by a search engine system. Based on the historical data, the server may generate models that indicate user intents and categories associated with the queries. In some embodiments, the servers may modify the query to match a model corresponding to the query, and then performed a search based on the model and the query.

In the illustrated embodiment, the techniques are described in the context of a user 102 operating a user device 104 to submit a query 106 to one or more server(s) 108 over one or more network(s) 110. For instance, the user 102 may submit the query 106 including terms of "Firefly MP3 download." The server 108 may perform a search based on these terms, and return a result 112 to the user device 104.

Here, the user 102 may submit the query 106 via network 110. The network 110 may include any one or combination of multiple different types of networks, such as cable networks, the Internet, and wireless networks. The user device 104, meanwhile, may be implemented as any number of computing devices, including as a personal computer, a laptop computer, a portable digital assistant (PDA), a mobile phone, a set-top box, a game console, a personal media player (PMP), and so forth. The user device 104 is equipped with one or more processors and memory to store applications and data. An application, such as a browser or other client application, running on the user device 104 may facilitate submission to the server 108 over network 110.

In architecture 100, the server 108 may perform a pre-processing 114, and then perform a real-time processing 116 in response to the query 106. The server 108 may perform the pre-processing 114 using search data 118 and relationship data 120. The search data 118 may include big-scale historical search data (e.g., millions queries and their results), and the relationship data 120 may include relational data structures of specific fields (e.g. song titles and artist names corresponding to the song titles). The server 108 may apply data mining technologies to generate models 122 indicating user intents associated with queries. A user intent may be indicated by one or more particular intent words/characters. For example, in the field of music, intended words may be "mp3 download" and "free download," and the model may be indicated as: "<Song> mp3 download," "<Song> free download" or "<Song> <Singer>." Here, <Song> and <Singer> represent the title of a song and a name of an artist, respectively. The pre-processing 114 is described in a greater detail in FIG. 2.

Figure 3:
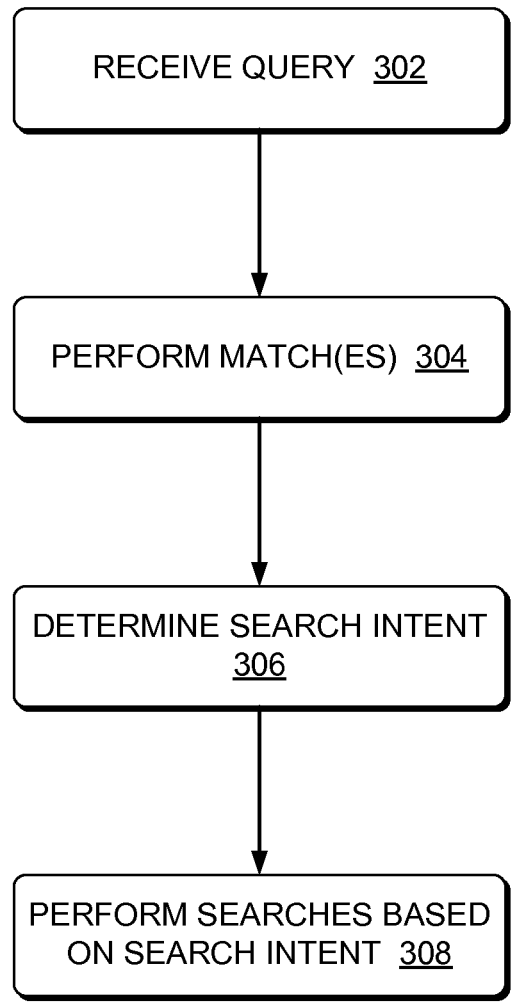
FIG. 3 illustrates an example flow diagram for performing searches.
Figure 4:
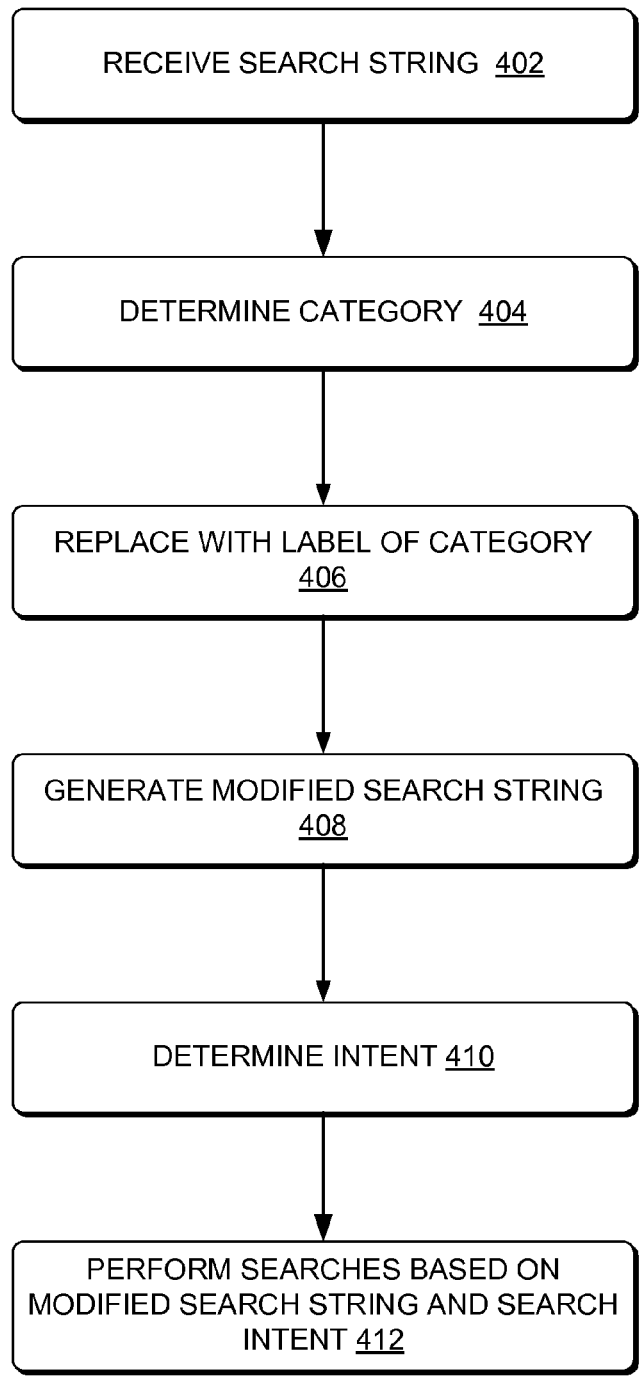
FIG. 4 illustrates another example flow diagram for performing searches.

In the illustrated embodiment, the server 108 may perform the real-time processing 116 based on the models 122, the relationship data 120 and the query 106 transmitted by the user device 104, which is described in a greater details in FIGS. 3 and 4.

Figure 2:
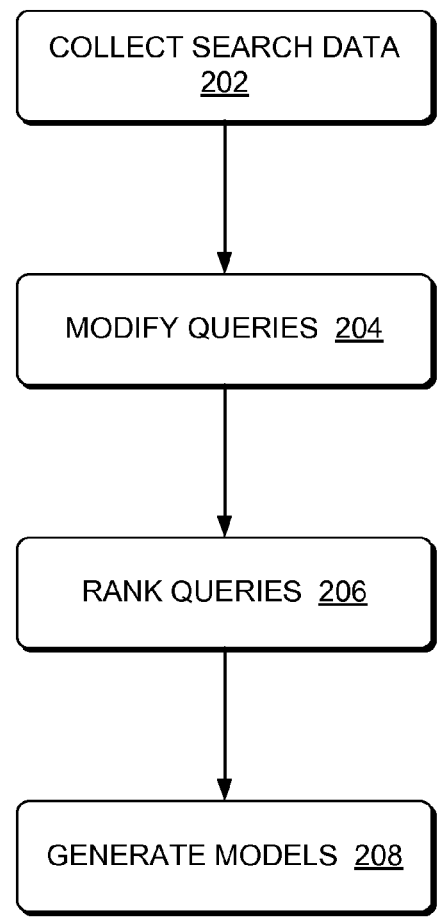
FIG. 2 illustrates an example flow diagram for data mining.

FIG. 2 illustrates an example flow diagram 200 for data mining to generate search models. In some embodiments, the search data 118 may include log data in a search engine system. The log data may record historical search strings submitted by users. The historical search strings may be one or more keywords, phrases or sentences. The relationship data 120 may include data in relational data structures used by specific fields (e.g., news, images, videos, maps, music, or shopping). As for search data of each field, the relational data structures can be used to store them. In some embodiments, the relational data 120 may be represented using relational math model (e.g., a 2-dimensional table). For example, in the field of music, a song title and the artist's name make up a pair of relationship data.

In the illustrated embodiment, at 202, the server 108 may collect the search data 118 that includes multiple queries. The multiple queries may include multiple historical search strings of specific fields.

At 204, the server 108 may modify the multiple queries. The server 108 may determine whether individual historical search string matches with a category of the relationship data of a specific field in a predetermined order. For example, the category may be indicated by metadata in the relationship data of the specific field. If a portion of the historical search string matches the metadata of any category, the server 108 may replace the portion with a label of the metadata category.

For example, the historical search string includes "Firefly Wang Fei MP3 download." If a match is found for song title "Firefly" and artist name "Wang Fei," the server 108 may change the string to "<Song> <Singer> MP3 download," wherein <Song> and <Singer> correspond to the labels of the song title and artist name, respectively.

At 206, the server 108 may rank the query based on a frequency of the modified query in the search data 118. In some embodiments, the server 108 may calculate a number of times/frequency that the historical search string appears, and then sort multiple queries in the search data 118 based on a frequency associated with individual query.

The server 108 may also determine historical search strings having frequencies being greater than a predetermined number. Based on these historical search strings, the server 108 may generate the models 122 at 208. In some embodiments, the matched historical search string that exceeds the frequency threshold may be used as the models 122. Accordingly, words/characters in the model may be used to indicate user intents associated with the multiple queries via intended words/characters.

For example, models for the field of music may include "<Song> <Singer>," "<Song> mp3 download," "<Song> ringtone <Singer>" and etc. In some embodiments, the model may include at least one of a label of category of the relationship data 120 and intended words obtained from the pre-processing 114. In these instances, a stand-alone intended word cannot make up a model. Also, the word that appears in a model may be the intended words, while a word that does not appear in a model may not be the intended words.

FIG. 3 illustrates an example flow diagram 300 for performing searches using models generated during data mining. The server 108 may perform an online matching process using models that are generated based on the search data 118. In some embodiments, the server 108 may combine generated intended words and labels of metadata categories of the relationship data 120 to generate data (e.g., a dictionary), which may be used for the online matching process.

At 302, the server 108 may receive a query from the user device 104. The query may include a string of words, characters, and/or symbols. At 304, the server 108 may perform online matches based on the received query. In some embodiments, a portion of the query may be compared against the dictionary, from left to right. In these instances, segmentation of the string may not be performed. For example, a single word as a unit may be used during the online match. If the string includes ideograms (e.g., Chinese), an individual character may be used as the unit. If the string includes alphabet (e.g., English), each word by means of the spaces/blanks may be distinguished. In these instances, an individual word may be used as the unit. For conventional technologies, searches are performed after the string has been segmented. However, segmentation is a slow process, and strings including new words may be incorrectly segmented, therefore causing inaccuracies for searches performed thereafter.

If a portion of the search string matches the metadata in the relationship data, the server 108 may replace the portion with a label of a corresponding metadata category to generate a modified search string. If a portion of the search string does not match the dictionary (i.e., metadata categories in the dictionary) and does not match intended words included in the dictionary, the server 108 may terminate the matching process. If the search string matches the dictionary from left to right and the modified search string matches a model generated during the pre-processing 114, the server 108 at 306 may determine search intent associated with the search string. At 308, the server 108 may perform searches based on the search intent.

In some embodiments, the search system may consider the user's level of attention in categorizing the relationship data 120 of a particular field (e.g., music, novel, film and other categories). The server 108 may then combine intended words of different fields to generate different types of dictionaries. During the search, the server 108 may first consider dictionaries of popular fields, and then non-popular fields. In some embodiments, the non-popular fields may not be considered unless there is no match in the popular fields.

Suppose that the dictionaries of popular fields include three fields: music, novel and film. After the user device 104 submits a search string: "MP3 Firefly Wang Fei", the server 108 may not perform segmentation, but analyze meaning of words or spaces/blanks. The server 108 may then recognize individual word, and separately perform matching with the dictionaries of the popular fields.

During the matching process, the server 108 may separately match the word "MP3" with the intended words and metadata in the dictionaries of music, novel, and film. Further suppose that the word "MP3" is found in the dictionaries of music and film. As a result, MP3 may be regarded as an intended word, and therefore no replacement may be performed. Then, the server 108 may match the character "Ying," then the character "Huo" and finally the character "chong" in the dictionaries of music and film.

Further suppose that all three characters are found in the dictionaries of music and film. As a result, the server 108 may replace the word "Firefly" (i.e., Ying Huo Chong) with a label <Song> in a music model based on the current models. In a film model, the server 108 may replace the word "Firefly" (i.e., Ying Huo Chong) with a label <Film>. After replacement, the match may continue to be performed to "Wang" and "Fei." Similarly, the words "Wang Fei" may be replaced with the label <Singer>. Accordingly, the model obtained after matching and replacement is "MP3 <Song> <Singer>", and this model may exist among the current models. Therefore, the server 108 may determine that the user's search intent is to find a song "Firefly" that is sung by Wang Fei.

In the above online matching process, although the word "Firefly" may also be found in other dictionaries (e.g., an insect category), the server 108 may not consider a category of insects since the category is not popular compared to the previously discussed categories of film, music and novels.

FIG. 4 illustrates another example flow diagram 400 for performing searches. At 402, the server 108 may receive a query including a search string. At 404, the server 108 may determine whether a portion of the search string matches with a category of pre-generated dictionary. In some embodiment, the dictionary may be a combination of intended words/characters that are generated from the pre-processing 114, and labels of categories of the relationship data 120.

In some embodiments, the matching may be performed between the search string, starting from left to right, and the pre-generated dictionary. In the matching process, there is no need to perform segmentation on the real-time search string, but an individual word may be used as the unit in performing the match, successively. The matching may be total matching including matches between all contents of the search string and intended words or labels of metadata in the dictionary. In some embodiments, since the elements in the generated models may have orders (e.g., "<Song> <Singer>" and "<Singer> <Song>"), the matching may be assigned a predetermined order (e.g., from left to right).

If a portion of the search string matches a category of categories in the dictionary, the server 108 may replace the portion with a label of the category at 406. After the replacement, the server may at 408 generate the modified search string that may include at least one of a label of the category, intended words and the unmatched portion. For example, if the search string "Firefly Wang Fei MP3 download" matches the song title "Firefly" and artist name "Wang Fei" in the metadata category, the server 108 may replace the search string with the labels to generate a modified search string: "<Song> <Singer> MP3 download".

At 410, the server 108 may determine search intent associated with the search string. At 412, the server 108 may perform searches based on the search string and the search intent. If the matching is performed successfully, the modified search string may include at least one of a label of the metadata category of the relationship data 120, a label of another category that include intended words, and unmatched portions of the search string.

For example, if the search string "Firefly Wang Fei MP3 download" matches the song title "Firefly" and artist name "Wang Fei" in metadata categories of the relationship data 120, the search string may be modified to include the intended words "MP3 download" and labels of the metadata categories. Accordingly, the search string "Firefly Wang Fei MP3 download" matches with a model "<Song> <Singer> MP3 download." This may help recognize that the search intent of the search string is to "download the song Firefly that was sung by Wang Fei". On the other hand, if the model "<Song> <Singer> free" does not exist among the pre-generated models, the search string and the model may be deemed as mismatching.

In some embodiments, the server 108 may place results data that correspond to a search intent on the first spot of returned search results. Also, the results can include several related metadata information. If the user 102 clicks the link to the metadata information, the server may lead the user to a webpage containing details associated with the metadata information.

For example, the results may include a song "Firefly" sung by "Wang Fei." The server 108 may place some related information on the first spot of the returned results. The related information may include the song title, artist name, album name, lyrics, file size etc. In these instances, each piece of information may be metadata, and the structure of the metadata is connected/inter-related. In addition, each piece of the metadata can be set up as a link.

Figure 5:
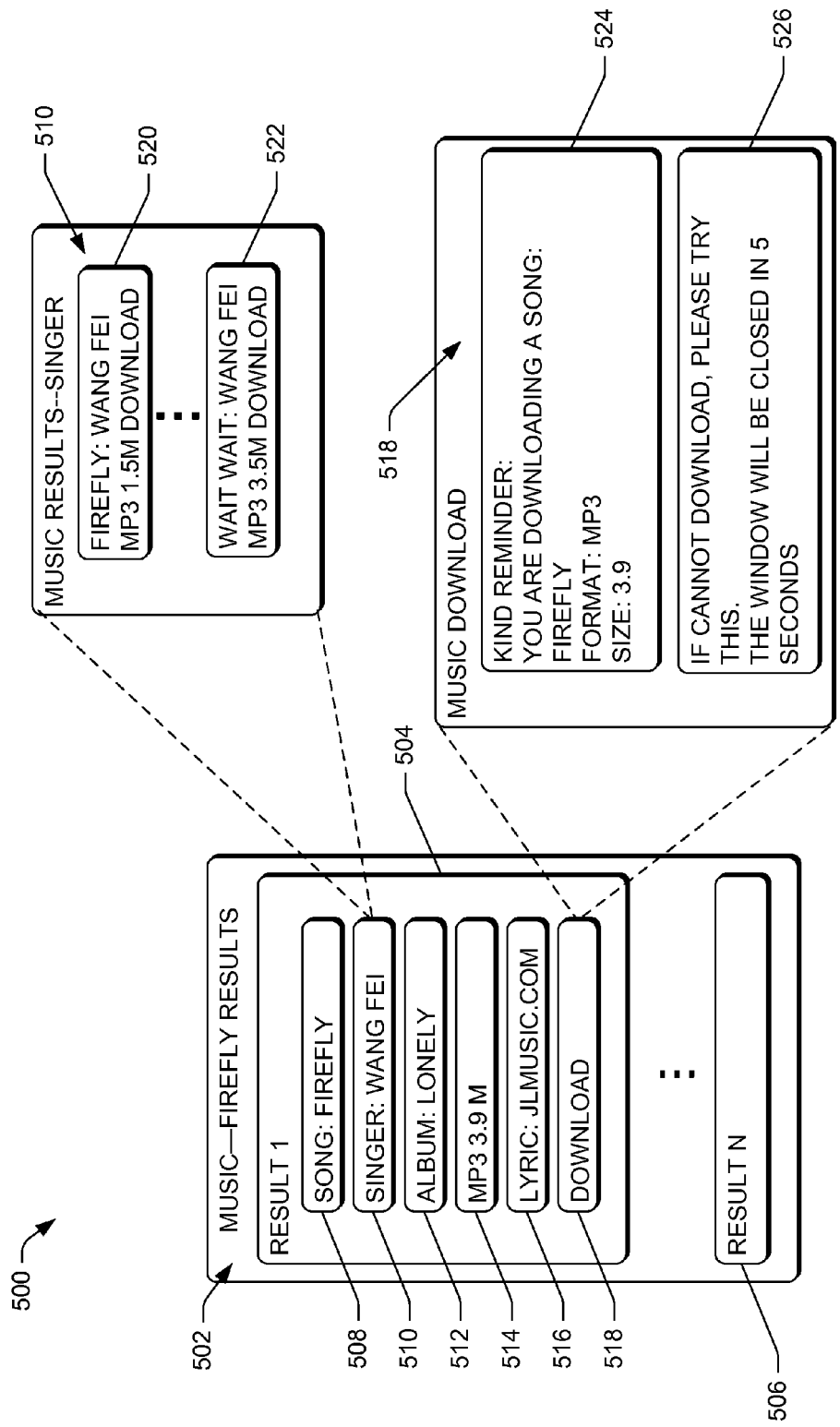
FIG. 5 illustrates an example user interface served by the server(s) of FIG. 1.

FIG. 5 illustrates an example user interface (UI) 500 served by the server(s) of FIG. 1. The UI 500 may be presented by the user device 104 or the server 108. The UI 500 may include a result section 502 including multiple results (e.g., a result 504 and a result 506). The result 504 may include multiple sections for detailed information regarding the search result. In the illustrated embodiments, the result 504 may include multiple subsections, e.g., a song title 508, a singer name 510, an album title 512 the song belongs to, a music format 514, a lyric source 516 and a download link 518.

In some embodiments, the multiple subsections may be expanded for the user 102 to review in more detail. In the illustrated embodiments, the singer name 510 may be expanded to include multiple song subsections indicating songs presented by the singer (e.g., subsection 520 and subsection 522). The expanded download link 518 may include a reminder 524 that indicates the song is being downloaded. The expanded download link 518 may also include a retry link 526 to enable the user 102 to retry if a previous download is not successful.

Figure 6:
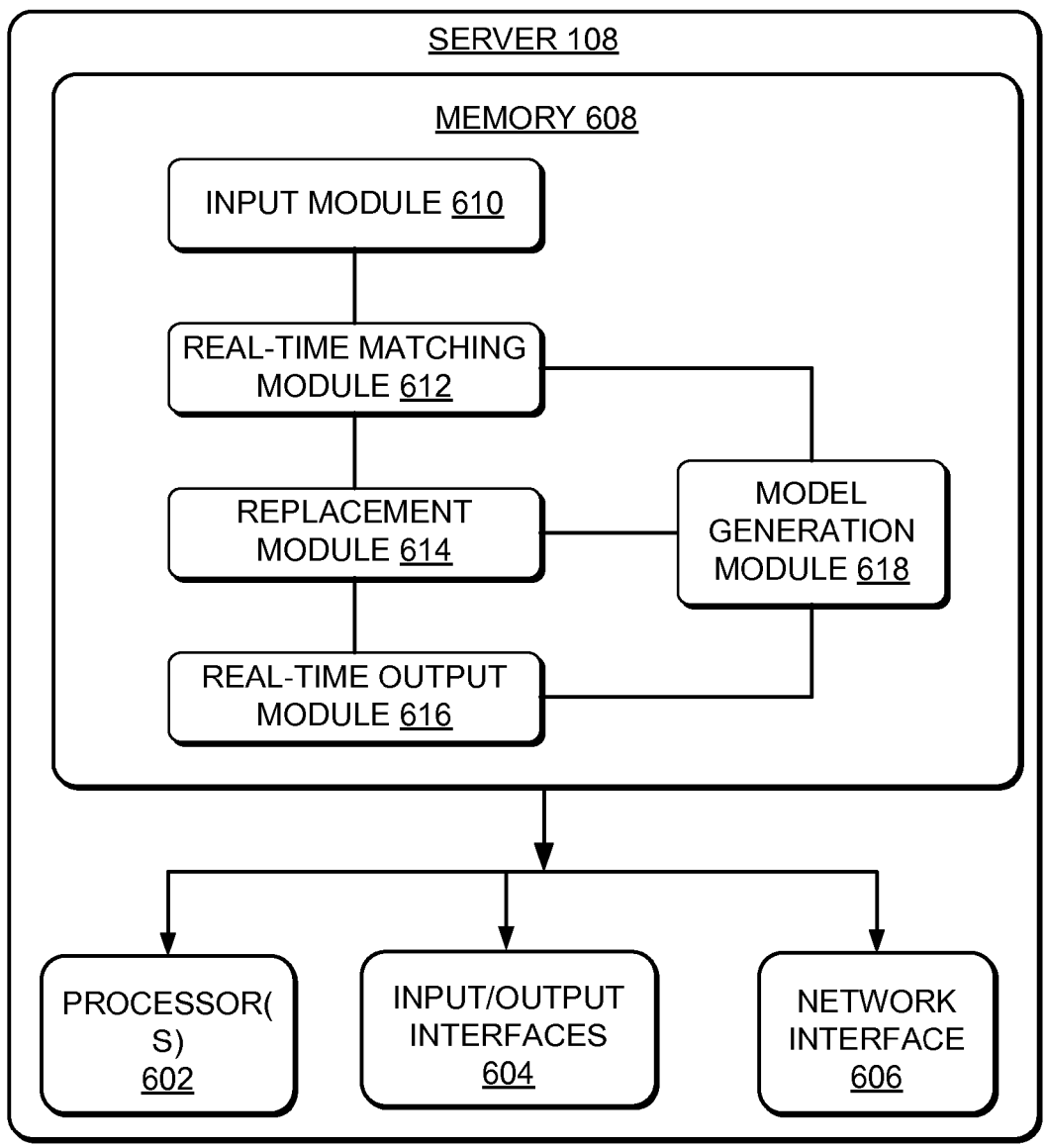
FIG. 6 illustrates an example server that may be deployed in the architecture of FIG. 1

FIG. 6 illustrates an example server 108 that may be deployed in the architecture of FIG. 1. The server 108 may be configured as any suitable computing device(s). In one exemplary configuration, the server 108 includes one or more processors 602, input/output interfaces 604, network interface 606, and memory 608.

The memory 608 may include computer-readable media in the form of volatile memory, such as random-access memory (RAM) and/or non-volatile memory, such as read only memory (ROM) or flash RAM. The memory 608 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media such as modulated data signals and carrier waves.

Turning to the memory 608 in more detail, the memory 608 may include an input module 610, a real-time matching module 612, a replacement module 614, a real-time output module 616 and a model generation module 618.

The input module 610 may be configured to receive a real-time search string. The real-time matching module 612 may be configured to perform matching between the real-time search string and the pre-generated dictionary, wherein the dictionary is a combination of the first category word and the second category word. The replacement module 614 may be configured to replace a portion with a label of the category where the second category word belongs when the portion of the real-time search string matches the second category word of any category in the dictionary. After the replacement, the real-time search string may include the label of the category where the first category word and/or the second category word belongs, and/or the unmatched portion.

The real-time output module 616 may be configured to determine the specific search intent of the matched real-time search string, and to return the search result data based on the specific search intent based on the pre-generated models. The pre-generated models may include at least one of metadata category labels and intended words. Correspondingly, the first category word in the dictionary may be the intended word in the models, and the second category word in the dictionary can be the metadata in the relationship data.

In some embodiments, if the matched real-time search string includes the label of the category where the second category word belongs, and/or, is made up of the label of the category where the first category word and second category word belong, then the matched real-time search string and any of the pre-generated models may be matched with each other. The matched real-time search string may include the specific search intent stated in the model.

The model generation module 618 may include a replacement sub-module configured to match the historical search string in the historical search data with the metadata in the relationship data in a predetermined order. If a portion of the historical search string matches the metadata of any category, the portion may be replaced with the label of the category of the metadata.

The model generation module 618 may also include a calculation sub-module configured to calculate the number of times/frequency that the matched historical search string appears, and perform sorting based on the calculated frequency. Then the model generation module 618 may use the matched historical search string that exceeds the frequency threshold as the model.

The present disclosure discloses an exemplary embodiment for a type of search engine system. In the exemplary embodiment, the search engine system may include the server 108 mentioned in any of the above exemplary embodiments. The exemplary embodiments of this disclosure may be implemented by a search device (e.g., the server 108) and/or search engine system, which may be used in the field of searching, especially web searching and mobile searching.

The present disclosure can be described in the context of computer executable instructions, such as a program module. In general, a program module includes executing specific tasks or implementing specific abstract data type routines, programs, objects, components, data structures, etc. The present disclosure can also be implemented in a distributed computing environment. In these distributed computing environment, tasks are executed using remote processing equipment, which are connected using communication networks. In a distributed computing environment, the program module can be stored in the local and remote computer storage media.

Here, relationship terms such as "first" and "second" are solely used to separate one entity or operation from another entity or operation, and not necessarily to require or imply that such actual relationships or sequences exist among these entities or operations. Also, the "and/or" indicates that this document comprises the "and" relationship, and also comprises the "or" relationship, wherein: if object A and object B have an "and" relationship, then it means that an exemplary embodiment can include both object A and object B at the same time; if object A and object B have an "or" relationship, then it means that an exemplary embodiment can include only object A, or only object B.

The specific examples herein are utilized to illustrate the principles and embodiments of the application. The description of the embodiments above is designed to assist in understanding the method and ideas of the present disclosure. However, persons skilled in the art could, based on the ideas in the application, make alterations to the specific embodiments and application scope, and thus the content of the present specification should not be construed as placing limitations on the present application.

What is claimed is:

1. One or more computer-readable media storing computer-executable instructions that, when executed by one or more processors, instruct the one or more processors to perform acts comprising:
   receiving a query including a string;
   replacing a first portion of the string with a label of a category of relationship data to generate a modified query when the first portion of the string matches with metadata of the category of the relationship data in a predetermined order;
   regarding a second portion of the string as an intended word of the received query that indicates an intent of the received query and keeping the second portion of the string in the received query without replacement when the second portion of the string matches with at least one intended word in a dictionary associated with the category of the relationship data, the at least one intended word indicating a user intent; and
   performing a search based at least in part on the modified query.

2. The one or more computer-readable media of claim 1, wherein the acts further comprise analyzing the modified query to determine the intent of the query based on one or more search models.

3. The one or more computer-readable media of claim 1, further comprising identifying an intention indicator included in the string, wherein the modified query includes the intention indicator and the label.

4. The one or more computer-readable media of claim 1, wherein the acts further comprise:
   collecting multiple queries from a historical search data;
   determining that a portion of a first query of the multiple queries matches with a first category of the relationship data;
   modifying the first query by replacing the portion of the first query with a first label of the first category of the relationship data to generate a modified first query;
   calculating a frequency that the modified first query appears in the historical search data; and
   generating one or more search models using the modified first query based on the frequency.

5. The one or more computer-readable media of claim 4, wherein generating the one or more search models using the modified individual query based on the frequency comprises:

ranking the multiple queries in the historical search data based on the frequency; and generating the one or more search models using one or more queries of the multiple queries that have frequencies greater than a predetermined number.

6. The one or more computer-readable media of claim 1, wherein the acts further comprise analyzing the modified query to determine the intent of the query based on one or more search models, the one or more search models being generated by analyzing historical search data and the relationship data.

7. The one or more computer-readable media of claim 6, wherein the historical search data is determined based on log data generated by a search engine system.

8. The one or more computer-readable media of claim 1, wherein the string includes at least one of a word, a character, a symbol, a phrase and a sentence.

9. The one or more computer-readable media of claim 1, wherein the relationship data includes a relational data structure in a particular field.

10. The one or more computer-readable media of claim 9, wherein the particular field comprises at least one of news, an image, a map and music.

11. The one or more computer-readable media of claim 1, wherein performing the search is based further on the intent of the received query.

12. A computer-implemented method comprising:
receiving a query including a search string;
generating a modified search string by replacing a first portion of the search string with a label of a category of relationship data when the first portion of the search string matches with metadata of the category of the relationship data in a predetermined order;
regarding a second portion of the search string as an intended word of the received query that indicates an intent of the received query and keeping the second portion of the search string in the received query without replacement when the second portion of the search string matches with at least one intended word in a dictionary associated with the category of the relationship data, the at least one intended word indicating a user intent; and
performing a search based at least in part on the modified search string.

13. The computer-implemented method of claim 12, further comprising:
collecting multiple queries from historical search data;
determining that a portion of a first query of the multiple queries matches with a first category of the relationship data;
modifying the first query;
calculating a frequency that the modified first query appears in the historical search data; and
generating one or more models using the modified first query based on the frequency.

14. The computer-implemented method of claim 13, wherein generating the one or more models using the modified first query based on the frequency comprises:
ranking the multiple queries in the historical search data based on the frequency; and generating the one or more models using one or more queries of the multiple queries that have frequencies greater than a predetermined number.

15. The computer-implemented method of claim 12, wherein the relationship data includes a relational data structure in a particular field.

16. The computer-implemented method of claim 15, wherein the particular field comprises at least one of news, an image, a map and music.

17. A computing device comprising:
one or more processors; and
memory to maintain a plurality of components executable by the one or more processors, the plurality of components comprising:
an input module that receives a query including a string,
a real-time matching module that determines whether a first portion of the string matches with a category of relationship data,
a replacement module that replaces the first portion of the string with a label of the category to generate a modified query when the first portion of the string matches with metadata of the category of the relationship data in a predetermined order;
a real-time output module that:
regards a second portion of the string as an intended word of the received query that indicates an intent of the received query, and keeps the second portion of the string in the received query without replacement when the second portion of the string matches with at least one intended word in a dictionary associated with the category of the relationship data, the at least one intended word indicating a user intent, and
performs a search based at least in part on the modified query.

18. The computing device of claim 17, further comprising a model generation module that:
collects multiple queries from historical search data;
determines that a portion of a first query of the multiple queries matches with a first category of the relationship data;
modifies the first query by replacing the portion with a first label of the first category of the relationship data to generate a modified first query;
calculates a frequency that the modified first query appears in the historical search data;
ranks the multiple queries in the historical search data based on the frequency; and
generates one or more models using one or more queries of the multiple queries that have frequencies greater than a predetermined number.

19. The computing device of claim 17, wherein the string includes at least one of a word, a character, a symbol, a phrase and a sentence.

20. The computing device of claim 17, wherein the real-time output module performs the search based further on the intent of the received query.

* * * * *